United States Patent [19]

Bergquist

[11] 4,385,659
[45] May 31, 1983

[54] HEATING AND COOLING THERMOSTAT SET POINTS LIMITS SET BY CHANGEOVER LEVER

[75] Inventor: Thomas A. Bergquist, Albuquerque, N. Mex.

[73] Assignee: Honeywell Inc., Minneapolis, Minn.

[21] Appl. No.: 241,166

[22] Filed: Mar. 6, 1981

[51] Int. Cl.³ .................... F23N 5/20; H01H 37/12
[52] U.S. Cl. ............................. 165/12; 165/27; 236/46 R; 337/360; 74/526
[58] Field of Search .................. 165/26, 27, 12; 236/46 R; 337/360, 323, 392, 303, 84; 74/526

[56] References Cited

U.S. PATENT DOCUMENTS

| | | | |
|---|---|---|---|
| 2,558,617 | 6/1951 | Kronmiller | 200/136.3 |
| 3,670,284 | 6/1972 | Fortier | 337/360 |
| 3,807,254 | 4/1974 | Brakebill | 74/526 |
| 3,999,158 | 12/1976 | Rae | 337/360 |
| 4,078,601 | 3/1978 | Kolbow | 165/26 |
| 4,249,155 | 2/1981 | Fitzgerald et al. | 337/360 |

OTHER PUBLICATIONS

Honeywell Brochure Form No. 60-2416-2 (Rev. 9-79), T8082A Fuel Save Thermostat.

Primary Examiner—Albert J. Makay
Assistant Examiner—Harry Tanner
Attorney, Agent, or Firm—Clyde C. Blinn

[57] ABSTRACT

A time controlled thermostat provides the setting up or setting down of space temperature during certain selected time periods depending on whether it is controlling heating or cooling apparatus as selected by a changeover lever. The normal control temperature as determined by a temperature responsive switch is set by a first selection lever and the setback temperature set by a second selection lever, during heating operation, as selected by the changeover lever the normal temperature is selected by the second selection lever and the setup temperature by the first selection lever during cooling operation as selected by the changeover lever. Limit stops are provided for limiting the position of the first lever during heating to a maximum temperature and the position of the second lever during cooling for a minimum temperature. The limits are made active by the changeover lever so that when the changeover lever is in the heating operation position, the limit for the first selection lever is made effective and when the changeover lever is in the cooling position, the limit for the second selection lever is made effective.

8 Claims, 5 Drawing Figures

HEATING AND COOLING THERMOSTAT SET POINTS LIMITS SET BY CHANGEOVER LEVER

BACKGROUND AND SUMMARY OF THE INVENTION

For many years, thermostats have had means to limit the adjustment of the temperature control point adjusting means or selection level to some selected value for both heating and cooling operations. Such limiting action has been for limiting the temperature for comfort and for energy conservation. With the advent of even higher energy costs, the need for limiting action in thermostats is even much more emphasized; in fact, certain localities have established laws to restrict the range of the temperature during heating and cooling operations.

Many prior art thermostats have had various methods for accomplishing a limiting action, such as the limiting action shown in the Donald P. Kolbow U.S. Pat. No. 4,078,601, issued Mar. 14, 1978, and the Richard E. Fitzgerald, et al, U.S. Pat. No. 4,249,155, issued Feb. 3, 1981. In each of these patents, the thermostats have a single control point adjustment means for selecting the temperature with a changeover switch button or lever for activating the limiting action for either heating or cooling.

In a time controlled thermostat of the type disclosed in the Carl G. Kronmiller U.S. Pat. No. 2,558,617, issued June 26, 1951, the normally controlled temperature is selected by a first lever and the setback temperature is selected by a second lever. If the thermostat is to be used for heating only, as disclosed in the Kronmiller patent, the first lever can be fixed with a screw to prevent the normal temperature from being selected above a certain value. Obviously, if a changeover switch is used to modify a time controlled thermostat having two separate levers for setting the normal and the setback temperature of the thermostat with a changeover switch to provide for the control of both heating and cooling apparatus, the lever used for the normal temperature control point selection does not remain the same. In the T8082A Fuel Saver Thermostat manufactured and sold by Honeywell Inc. and shown in its Brochure 60-2416-2 of September 1979 when used with a Q682A Switching Subbase for heating and cooling such is the case. Since the lever for selecting the normal temperature control for heating and cooling changes from one lever to the other, the conventional manner of limiting the position of the lever used to select the normal control temperature, such as a set screw, could not be used. The limiting action changes depending upon whether the thermostat is in the heating or cooling operation.

The present invention is concerned with a time controlled thermostat having a first and a second temperature control point selection levers and a changeover switch lever to change the connection of the thermostat between heating and cooling apparatus. Limits are provided for one of the other of the first and second levers which are made effective by the changeover switch lever so that in the heating operation the first lever is limited in its movement for temperature selection, and in the cooling operation the second lever is limited in its movement for temperature selection.

DESCRIPTION OF THE PREFERRED EMBODIMENT

Figure 1:
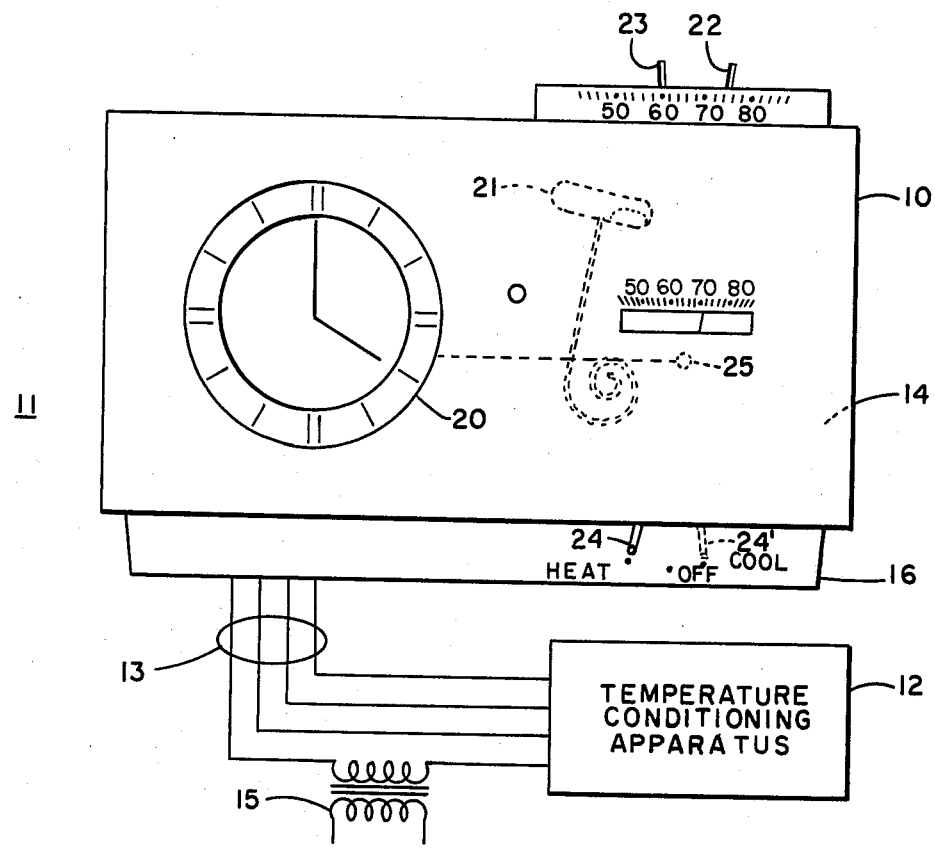
FIG. 1 is a schematic showing of a time controlled thermostat having two levers for setting the normal temperature and the setback or setup temperature, and a changeover switch lever moving between the positions of HEAT, OFF, and COOL.

Referring to FIG. 1, a time controlled or electric clock thermostat 10 is used to control the temperature in a space 11 of a building or home by controlling the operation of a temperature conditioning apparatus, furnace or air conditioning apparatus 12 supply temperature condition medium or air to space 11. The thermostat is connected by wires 13 for controlling the temperature conditioning apparatus from a power source 15 in a manner as accomplished with the mentioned T8082A Fuel Saver Thermostat using the Q682A Switching Subbase. Specifically, a clock or time controlled mechanism 20 provides for the control by a conventional bimetal operated switch apparatus or temperature responsive sensor 21 to control conditioning apparatus 12 to maintain a temperature in space 11 as selected by a temperature set point selector level 22 or 23 depending on the mode operation selected.

During selected periods of time as might be selected by the homeowner, a setback temperature is maintained as selected by a temperature set point selection lever 23 during the heating operation. The heating operation is selected by a changeover lever 24 which as shown in the HEAT position electrically connects thermostat sensor 21 to heating apparatus. During a cooling operation with lever 24 in cooling position 24', lever 23 selects the normal temperature to be controlled by the temperature responsive means 21 and lever 22 selects the setup temperature during certain selected periods of time.

Figure 2:
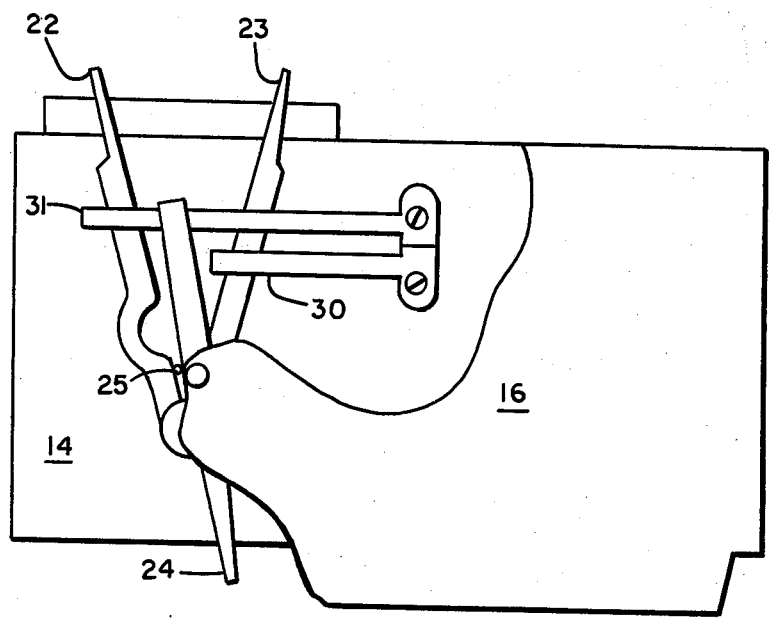
FIG. 2 is a cutaway showing of the actual levers and the limit stops for levers and from the back of the thermostat of FIG. 1.

Referring to FIG. 2, the base 14 of the thermostat and temperature selection levers 22 and 23 are shown a changeover lever 24 is mounted on a subbase 16. Output member 25 connected to clock 20 and temperature responsive switch apparatus 21 bears against one or the other of levers 22 and 23, depending upon which lever is to be used to set the normal control temperature for any particular selected period of time and the setback or setup control temperature. A pair of flexible limit stop members 30 and 31 are connected to the thermostat base 14 to cooperate with levers 22 and 23 in the manner to be described with the use of FIGS. 3, 4 and 5.

Figure 3:
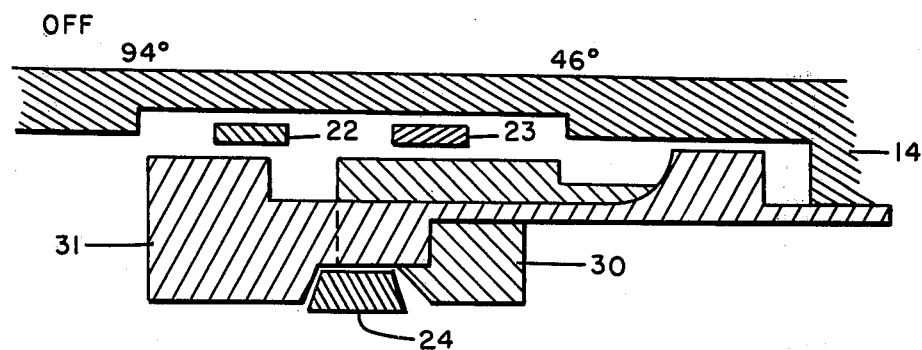
FIGS. 3, 4 and 5 are top operational views of the temperature selection levers and changeover levers of the thermostat shown in FIG. 2.
Figure 4:
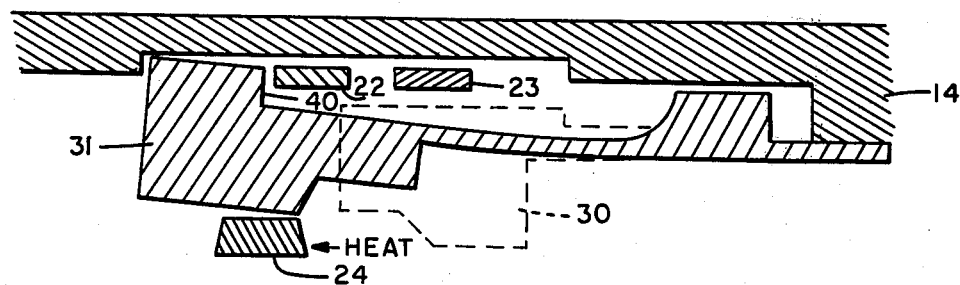
Figure 5:
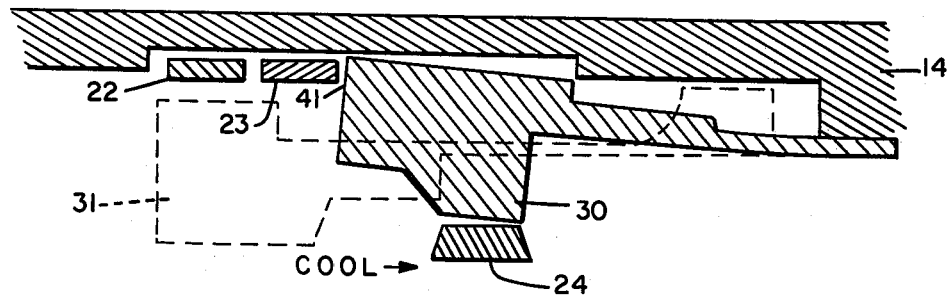

Referring to FIG. 3, limit stop members 30 and 31 are shown in a neutral position as the changeover switch lever 24 is in the OFF position. In such a position, levers 22 and 23 are free to move in the complete range of operation. Referring to FIG. 4, changeover lever 24 is moved to the HEAT position and stop member 31 is bent inward to limit the movement of lever 22 to a maximum heating position during normal operation. Setback lever 23 is free to move to the far right to a low temperature selection position. Referring to FIG. 5, lever 24 is moved to the COOL position and stop member 30 is bent to limit the range of movement of lever 23 which is now used for setting the normal temperature control point of the thermostat. Lever 22 which is now for setting the setup temperature of the thermostat, is free to move to a higher temperature selection.

OPERATION OF THE PREFERRED EMBODIMENT

By design of stop members 30 and 31, the maximum temperature which can be selected by lever 22 during the heating operation, and the minimum temperature which can be selected by lever 23 during the cooling operation, is predetermined; therefore, while the particular temperatures for this design are limited to a maximum of 72° Fahrenheit for heating and a minimum of 78° Fahrenheit for cooling, by means of the size of the stops and levers, different limiting temperature settings could be obtained.

During the heating operation, as shown, with lever 24 in the HEAT position in FIG. 1, and in the HEAT position in FIG. 2, limit stop 31 shown in FIG. 4 is bent or moved inward toward the base and a projection 40 limits the upward temperature selection movement of lever 22 which is used to control the normal temperature during the heating operation. Lever 23, which is the setback temperature selection lever, is free to move in a lower range. By means of the dimension of stop member 31 and the position and size of lever 22, a maximum temperature is selected of 72°.

When changeover lever 24 is in the cooling position, as shown in FIG. 5, lever 23 selects the normal temperature to be controlled during the cooling operation. Stop 30 is bent or moved inward toward the base 14 and a projection 41 limits the position of lever 23. Lever 22 which now is used to select the setup temperature is free to move within a certain range. By means of the dimensions of stop member 30 and the position and size of lever 22, the minimum temperature to be obtained during the cooling operation is set at 78°.

The embodiments of the invention in which an exclusive property or right is claimed are defined as follows:

1. A time controlled thermostat comprising:
   clock means having a selectively programmed output for time periods,
   space temperature responsive switch means,
   changeover switch apparatus connected to said temperature responsive switch means and adapted to connect said switch means to control either heating apparatus or cooling apparatus,
   first and second temperature selection means,
   means connecting said first and second temperature selection means and said clock means to said temperature responsive means for selecting a normal temperature and a different temperature to be maintained in the space at different time periods,
   first limit means associated with said first temperature selection means,
   means connecting said changeover switch apparatus to engage said first limit means to move said limit means to limit the range of said normal temperature by said first temperature selection means when said changeover switch apparatus is in a first predetermined position,
   second limit means associated with said second temperature selection means, and
   means connecting said changeover switch apparatus to engage said second limit means to move said second limit means to limit the range of said normal temperature by said second temperature selection means when said changeover switch apparatus is in a second predetermined position,
   said changeover switch apparatus selectively switches said temperature responsive switch means whereby in said first predetermined position said temperature responsive switch means is adapted to control heating apparatus and in said second predetermined position said temperature responsive switch means is adapted to control cooling apparatus.

2. The invention of claim 1 wherein
   said first limit means limits the space temperature selected by said first temperature selection means during heating operation to a maximum of 72° Fahrenheit and
   said second limit means limits the space temperature selected by said second temperature selection means during cooling apparatus to a minimum of 78° Fahrenheit.

3. A time controlled thermostat comprising
   a base member and a subbase member,
   first and second levers connected at one end thereof to said base member,
   temperature responsive switch means mounted on said base member,
   changeover switch means mounted on said subbase member connected to said temperature responsive switch means and adapted to connect said temperature responsive switch means to either heating or cooling apparatus,
   a changeover lever connected to said subbase member and to said changeover switch means, said changeover lever is manually moved between a first position for a heating operation and to a second position for a cooling operation,
   clock means mounted on said base member having an output member programmed for movement in one position or a second position at different time periods,
   means including said output member for connecting said temperature responsive means to one of said first or second levers to determine a normal and a different temperature of said responsive means at different time periods,
   stop means connected to said base member,
   means connecting said changeover lever to said stop means for limiting the movement of each of said levers,
   said stop means comprises a pair of members attached at one end thereof to said base member, said stop members being flexible to selectively move inward toward said base member when engaged by said changeover lever,
   a first of said stop members having a projection at one end thereof for engaging said first lever to limit its movement when said changeover lever is in said first position, and
   a second of said stop members having a projection at one end thereof for engaging said second lever when said changeover switch lever is in said second position.

4. The invention of claim 3 wherein
   when said changeover switch apparatus is in a position for heating operation, said second lever is set for said different temperature, and
   when said changeover switch apparatus is in a position for cooling operation, said first lever is set for said different temperature.

5. The invention of claim 1 wherein said second temperature selection means is limited by said first temperature selection means.

6. The invention of claim 5 wherein said second temperature selection means is adjusted for said different temperature to be maintained.

7. The invention of claim 1 wherein said first and second limit means are replaceable to select different ranges of temperature for said normal temperature during either cooling or heating operation.

8. The invention of claim 3 wherein said stop means limits said normal temperature to be maintained during both the heating and cooling operations.

* * * * *